Oct. 11, 1955  E. G. DORNFELD  2,720,606
ELECTRON MICROSCOPY
Filed Dec. 23, 1953
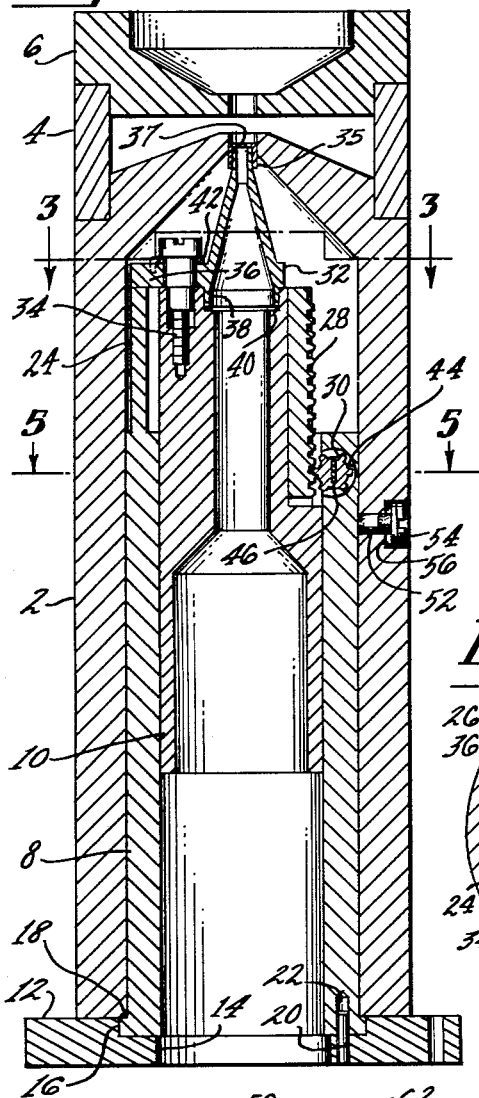
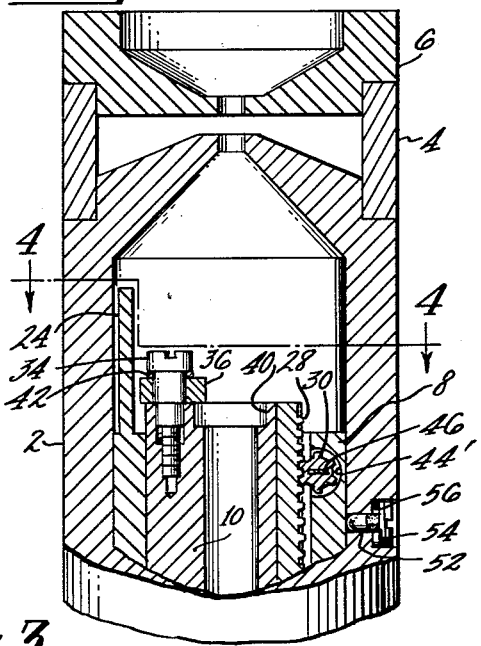
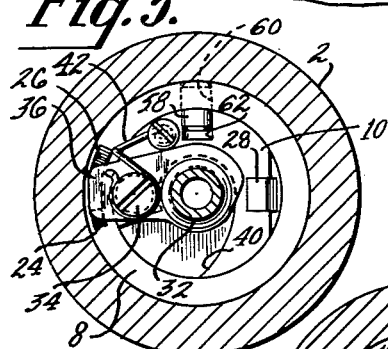
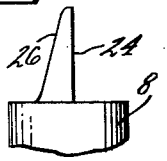
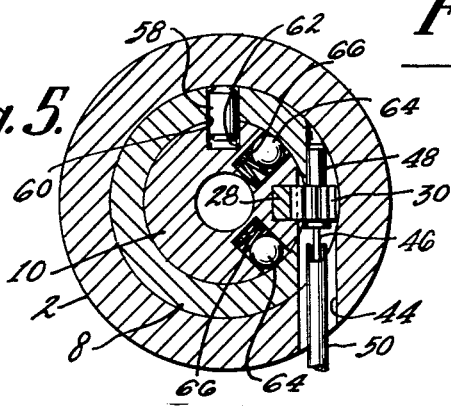
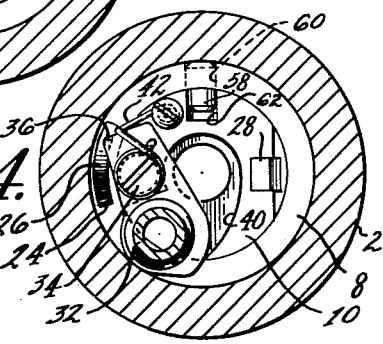
INVENTOR.
Edmund G. Dornfeld
BY Morris B. Rabin
ATTORNEY

United States Patent Office 2,720,606
Patented Oct. 11, 1955

2,720,606

ELECTRON MICROSCOPY

Edmund G. Dornfeld, Barrington, N. J., assignor to Radio Corporation of America, a corporation of Delaware Application December 23, 1953, Serial No. 400,014

The terminal fifteen years of the term of the patent to be granted has been disclaimed 4 Claims. (Cl. 313—84)

This invention relates to electron microscopy and, more particularly, to aperture plates for the lenses of such electron optical apparatus as microscopes and diffraction cameras.

In order to achieve high image contrast and good resolution in an electron microscope, an aperture plate having a very small central aperture is positioned adjacent the microscope's objective lens. However, when diffraction patterns of the type known as Abbé patterns are sought, such a small aperture blocks or otherwise obscures a desirable portion of the image formed at the objective lens. Consequently, when such studies are desired using a microscope of the type having such an aperture plate, it is necessary that the aperture plate be removed. In the heretofore conventional electron microscope, it would be necessary to shut down the machine and open the column to the atmosphere in order to gain access to the location of the aperture plate for the removal or placement thereof. This is time consuming and leads to inefficient operation of the apparatus.

It is, accordingly, an objective of this invention to provide an object lens structure for an electron microscope which obviates the foregoing difficulties.

It is another object of this invention to provide an objective stage for electron microscope wherein an aperture plate may be selectively positioned rendering the instrument suitable for use for either microscopic or diffraction studies.

It is a further object of this invention to provide an objective stage as set forth wherein the aperture plate may be selectively positioned without breaking the vacuum in the apparatus.

In accomplishing these and other objects, there has been provided, in accordance with the present invention, an objective stage for an electron microscope in which a two section telescoping sleeve member is positioned interiorly of the lower pole piece. One section is relatively fixed and the other section is adapted to be moved up and down within the first member. The second member carries a pivoted aperture plate holder member. Cooperative cam means are provided for positioning the aperture plate holder member in a desired position depending upon the vertical position of the inner sleeve member. Mechanical means accessible from the exterior of the microscope is provided for selectively positioning the inner sleeve with respect to the outer sleeve whereby to correspondingly position the aperture plate.

A better understanding of this invention may be had from the following detailed description when read in connection with the accompanying drawing in which:

Figure 1 is an elevational view in cross section of an objective stage embodying the present invention;

Figure 2 is a fragmentary view similar to Figure 1 but showing the inner sleeve member in its lowered position;

Figure 3 is a cross sectional view taken along the line 3—3 of Figure 1 and looking in the direction of the appended arrows;

Figure 4 is a cross sectional view taken along the line 4—4 of Figure 2 looking in the direction of the appended arrows;

Figure 5 is an elevational view in cross section of an objective stage embodying the present invention; and Figure 6 is a fragmentary view of the cam surface of the outer sleeve member.

Referring to the drawings in more detail, there is shown an objective stage which includes a lower pole piece member 2 made of suitable magnetic iron, a non-magnetic spacer 4 and an upper pole piece member 6 also made of magnetic iron.

Within the lower pole piece, there is positioned a first sleeve member 8 and a second or inner sleeve member 10. The inner sleeve member is telescopically positioned for axial movement within the first sleeve member 8. The first sleeve member 8 is relatively securely held within the cylindrical portion of the lower pole piece 2.

The lower pole piece 2 rests upon and may be secured to a base plate member 12 which has a central opening 14 and a concentric recess 16. The recess 16 is of a diameter slightly larger than the internal diameter of the lower pole piece 2. The first sleeve member 8 is provided at its lower end with a slight flange 18. The lower end of this first sleeve member 8 seats in the recess 16 in the base plate 12 and is held against axial movement by the overhang of the lower pole piece which engages the flange 18. A pin 20 extending through the base plate 12 and into a corresponding hole 22 in the first sleeve member 8 prevents the sleeve 8 from rotating with respect to the base plate 12 and pole piece 2.

The upper end of the first sleeve member 8 is provided with an extension 24 having a sloping cam surface 26 on one side thereof. The inner sleeve member 10 is provided on one side with a rack gear 28 which is cooperatively engaged by a pinion 30 carried by the first sleeve member 8. The upper end of the inner sleeve member 10 carries a conical aperture plate holder 32 which is pivotally secured to the inner sleeve member 10 by a pivot screw 34 which passes through a tongue 36 extending from one side of the base of the conical aperture plate holder 32. An aperture plate 35, having a small aperture 37 therein, is mounted on the upper end of the holder 32. The tongue 36 extends beyond the periphery of the inner sleeve 10 to a position where it engages the sloping cam surface 26 of the extension 24 at the upper end of the first sleeve member 8. The base of the conical aperture plate holder 32 is provided with a depending lip 38 which fits into a milled out recess 40 in the top of the inner sleeve 10. This recess 40 surrounds the central bore of the inner sleeve 10 and extends, in an arcuate path, to one edge of the sleeve.

A torsion spring 42 is cooperatively associated with the conical member 32 to bias that member into axial alignment with the lens defined by the pole pieces. The spring 42 tends to cause a counter-clockwise rotation of the conical member, in the illustrated example, about the pivot screw 34. This causes the depending lip 38 on the conical member 32 to be seated fully in the recess which is dimensioned to define the position of axial alignment.

As previously noted, an extension of the tongue 36 projects beyond the periphery of the inner sleeve 10 to a position of engagement with the cam surface 26 of the first or outer sleeve 8. When the inner sleeve is moved downward by operation of the rack 28 and pinion 30, the cam surface 26 causes the conical member 32 to rotate against the bias of the spring 42 in a clockwise direction and out of the alignment with the axial bore of the inner sleeve 10. Removal of the conical member 32 in this manner effectively removes the aperture plate 35 from the operative position, as it would be used with an electron microscope, to the out-of-the-way position that would be used with the diffraction camera.

In order to render the pinion gear 30 accessible from the exterior of the lens, a hole 44 is drilled through the lower pole piece and through the outer sleeve, the hole 44 being substantially tangential to the inner sleeve 10. The pinion 30 is mounted within this hole, in engagement with the rack 28. A flattened end portion 46 on the shaft 48 of the pinion may be engaged by a suitable slotted key 50 inserted through the opening. The shaft of the key is suitably grommeted (not shown) to prevent the passage of air into the vacuum chamber.

To prevent vibration of the first sleeve 8 within the bore of the lower pole piece 2, pressure is exerted on the body of the sleeve by a rubber or the like pressure pad 52 which is adjustably pressed by a screw threaded 54 into an opening 56 in the wall of the lower pole piece 2.

Relative rotation of the inner sleeve member with respect to the outer sleeve member is prevented by a pin 58 which passes through a hole 60 in the first sleeve member 8 into a longitudinal groove 62 in the wall of the inner sleeve member 10. A pair of spring pressed bearings 64 located in suitable recesses 66 in the inner sleeve member 10 provide sufficient friction to maintain the inner sleeve at a position determined by the operation of the rack and pinion.

Thus, there has been provided an improved objective stage for electron microscope wherein an aperture plate may be selectively inserted in the electron beam path or removed therefrom at will without the necessity of breaking the vacuum.

What is claimed is:

1. In an electron microscope, an objective stage comprising, in combination, an objective lens assembly including an upper pole piece and a lower pole piece, said lens having a lens axis, an aperture plate having a small aperture therein, and means positioned within said lower pole piece but accessible from exteriorly of said pole piece for selectively positioning said aperture plate in and out of register with said lens axis.

2. In an electron microscope, an objective stage comprising, in combination, an objective lens assembly including an upper pole piece and a lower pole piece, said lower pole piece having a substantially cylindrical portion, a first sleeve member substantially fixedly positioned within said cylindrical portion of said lower pole piece, a second sleeve member telescopically mounted within said first sleeve member, an aperture plate member having a small aperture therein, an aperture plate holder member pivotally secured to said inner sleeve, means accessible from exteriorly of said objective stage for moving said second sleeve longitudinally with respect to said first sleeve, and means including said aperture plate holder member responsive to relative movement of said two sleeve members for moving said aperture plate selectively into and out of axial alignment with said lens.

3. In an electron microscope, an objective stage comprising, in combination, an objective lens assembly including upper pole piece and a lower pole piece, said lower pole piece having a substantially cylindrical portion, a first sleeve member substantially fixedly positioned within said cylindrical portion of said lower pole piece, a second or inner sleeve member telescopically mounted within said first sleeve, an aperture plate member having a small aperture therein, an aperture plate holder member pivotally secured to said inner sleeve, a rack gear on said inner sleeve, a pinion gear carried by said first sleeve and meshed with said rack gear, means accessible from exteriorly of said objective stage and including said rack and pinion for moving said inner sleeve longitudinally with respect to said first sleeve and means including said aperture plate holder member responsive to relative movement of said two sleeve members for moving said aperture plate selectively into and out of axial alignment with said lens.

4. In an electron microscope, an objective stage comprising, in combination, an objective lens assembly including upper pole piece and a lower pole piece, said lower pole piece having a substantially cylindrical portion, a first sleeve member substantially fixedly positioned within said cylindrical portion of said lower pole piece, a second or inner sleeve member telescopically mounted within said first sleeve, an aperture plate member having a small aperture therein, an aperture plate holder member pivotally mounted on said inner sleeve, a rack gear mounted on said inner sleeve, a pinion gear carried by said first sleeve and meshed with said rack gear, means accessible from exteriorly of said objective stage and including said rack and pinion for moving said inner sleeve longitudinally with respect to said first sleeve, a cam member projecting from said first sleeve adjacent to and in camming engagement with a portion of said aperture plate holder, and means including said cam member and said aperture plate holder member responsive to relative movement of said two sleeve members for moving said aperture plate selectively into and out of axial alignment with said lens.

References Cited in the file of this patent

UNITED STATES PATENTS

| | | |
|---|---|---|
| 2,247,524 | Schuchmann et al. | July 1, 1941 |
| 2,347,348 | Young | Apr. 25, 1944 |
| 2,606,292 | Columbe | Aug. 5, 1952 |